United States Patent

[11] 3,607,072

| [72] | Inventors | Mendel Friedman;<br>James F. Cavins, both of Peoria, Ill. |
|---|---|---|
| [21] | Appl. No. | 8,112 |
| [22] | Filed | Jan. 21, 1970 |
| [23] | | Division of Ser. No. 758,151, Sept. 6, 1968, Patent No. 3,607,072 |
| [45] | Patented | Sept. 21, 1971 |
| [73] | Assignee | The United States of America as represented by the Secretary of Agriculture |

[54] NOVEL CYSTEINE DERIVATIVE
1 Claim, No Drawings

[52] U.S. Cl. .................................................. 23/230 R, 260/294.8 G

[51] Int. Cl. .................................................. C07d 31/48, G01n 31/08

[50] Field of Search ................................. 23/230, 232 C; 260/294.8 G

[56] References Cited
OTHER REFERENCES
F. Kanne, Chem. Abstr. 59, 9300h (1963)

*Primary Examiner*—Morris O. Wolk
*Assistant Examiner*—R. M. Reese
*Attorneys*—R. Hoffman and W. Bier

ABSTRACT: S-B-(4-pyridylethyl)-*L*-cysteine, a novel amino acid produced by reacting *L*-cysteine and 4-vinylpyridine in the presence of triethylamine, is ninhydrin-positive and very highly resistant to acid hydrolysis. It is particularly useful as an internal standard for chromotographic analyses of basic amino acids.

NOVEL CYSTEINE DERIVATIVE

This is a division of application Ser. No. 758,151 filed Sept. 6, 1968, and now U.S. Pat. No. 3,531,490.

A nonexclusive, irrevocable royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the 4of a novel cysteine derivative, namely S-$\beta$-(4-pyridylethyl)-L-cysteine, that exhibits a much more prolonged resistance to destruction by hydrochloric acid under the conditions of protein hydrolysis than do most of the presently known amino acids, and that in addition also precisely fulfills the linear ninhydrin and other requirements including discrete elution for use in amino acid analyses. Thus, the surprising fact that S-$\beta$-(4-pyridylethyl)-L-cysteine is not destroyed by even 120 hours of reflux in boiling HCl unexpectedly broadens its utility from that of rare possible external standard for protein analysis to that of a uniquely reliable internal standard for the analysis especially of basic amino acids, and which thereby enables the development of computerized amino acid analysis systems that cannot be even contemplated with the cumbersome use of external reference standards nor only by the use of norleucine, which is well known to be operative only on acidic and neutral columns, i.e., for acidic and neutral amino acids.

Despite the well-known simplification and shortening of procedures that are required when internal rather than external standards are used for very precisely determining the concentrations of amino acids separated by ion-exchange chromatography of protein hydrolysates, there previously has been no amino acid that could serve as an internal standard on basic or neutral columns for basic or neutral amino acids similar to the use of norleucine primarily on acidic columns for acidic amino acids. Our novel cysteine derivative is unique in that it can be used on basic columns as an effective internal standard for basic amino acids because it fulfills the following rigid requirements: (a) it is ninhydrin-positive, and its ninhydrin color yield obeys Beer's law; (b) it is extremely stable to acid hydrolysis in distinction to the protein being digested; (c) it elutes in a position which does not overlap other amino acid peaks; (d) and advantageously it is not a naturally occurring amino acid.

The present invention is directed to a novel derivative of L-cysteine which unobviously fulfills the above requirements and is, thus, a reliable internal standard for extremely accurate amino acid analyses of basic amino acids.

One object of our invention is the provision of a novel amino acid that is uniquely stable to acid hydrolysis, is linear as to its ninhydrin intensity, and which elutes in a position which is discernibly distant from the peaks of other basic amino acids.

A more specific object is the provision of a novel amino acid whose totality of explicit properties make the new compound particularly advantageous as an internal standard for the calibration and calculation of amino acid analysis data obtained from ion-exchange chromatography of acid hydrolysates of proteins.

GENERAL STATEMENT OF THE INVENTION

In accordance with the herein stated objects of the invention we have now synthesized the novel amino acid S-$\beta$-(4-pyridylethyl)-L-cysteine having the structure

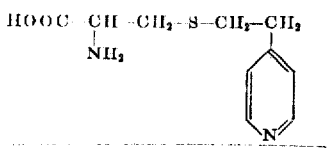

and have discovered that our hydrochloric acid resistent new amino acid is uniquely suited for use as an internal standard for amino acid analyses by chromatography on basic columns by virtue of its acid resistance (100 percent recovery at 24 hours and 98.4 percent at 120 hours), its ninhydrin color yield of 1.02±0.03, and because it elutes from acid columns as a well-resolved peak completely subsequent to the histidine and ammonia peaks and completely prior to that of arginine.

Preparation of S-$\beta$-(4-pyridylethyl)-L-cysteine

To a solution of g. (0.0165 mole) of L-cysteine in 40 ml. of deionized, distilled water was added 1.75 ml. (0.0165 mole) of 4-vinylpyridine and 2.3 ml. (0.0165 mole) of triethylamine, and the reaction mixture was magnetically stirred under nitrogen atmosphere for 24 hours followed by successive reductions of volume and crystallizations in a rotary evaporator at 40° C. The total weight of three crops of crystals was 4.9 g. (90 percent). The structure of the compound, recrystallized from aqueous enthanol as fluffy needles, was confirmed by infrared nuclear magnetic resonance, and mass spectroscopic analyses. The elemental analysis was as follows:

Anal. Calcd. for $C_{10}H_{14}N_2SO_2$ $_{10}$(226.30); 1 G. 53.08; H, 6.24; N, 12.38; S, 14.17. Found: C, 53.02; N, 6.21; N, 12.4; S, 14.12.

EXAMPLE 2

The practical employment of the above obtained cysteine derivative was exhibited in the following manner wherein respective 1hydrolysates of bovine serum albumin and of Ponca flour in 2 ml. constant boiling 6N HCl also containing 100 gammas each of S-$\beta$-(4-pyridylethyl)-L-cysteine for a basic column and of norleucine for an acidic or neutral column, were evaporated to dryness under reduced pressure, the residue redissolved in water, and after several repetitions finally redissolved in pH 2.2 citrate buffer for analysis.

The 3-hour procedure of Benson et al., Anal. Chem. 37:1108 (1965), was employed using a Beckman Model 120 amino acid analyzer. Electronic quantitation of peaks on the basic column was based on our novel cysteine derivative whereas those on the acidic or neutral column were based on the norleucine peak. The value equivalents for the two internal standard were calculated by a programmed digital computer from several standard analyses using a known equation, and then the so-obtained equivalents were used in another equation to calculate the micromoles of the various amino acids per gram of sample.

Table I sets forth the thusly obtained percent amino acid compositions of bovine serum albumin and of Ponca flour, which values are consistent with the laboriously obtained literature values.

TABLE I

| Amino Acid | BSA | Ponca Flour |
|---|---|---|
| L-lysine | 12.4 | 1.90 |
| L-histidine | 3.64 | 1.80 |
| L-arginine | 5.57 | 3.35 |
| L-aspartic acid | 10.2 | 3.23 |
| L-threonine | 5.30 | 2.38 |
| L-serine | 3.81 | 4.30 |
| L-glutamic acid | 23.6 | 40.1 |
| L-proline | 4.78 | 9.92 |
| Glycine | 1.67 | 2.80 |
| L-alanine | 5.64 | 2.19 |
| L-valine | 5.79 | 3.21 |
| L-methionine | 1.01 | 1.55 |
| L-isoleucine | 2.61 | 3.22 |
| L-tyrosine | 4.80 | 3.25 |
| L-phenylalanine | 6.16 | 4.33 |

We claim:
1. In a chromatographic process for determining and precisely identifying and quantitating the basic amino acids in a hydrochloric acid-hydrolyzed protein material, the improvement comprising adding to the protein material, prior to the said acid hydrolysis thereof, an internal standard reference quantity of S-$\beta$-(4-pyridethyl)-L-cysteine.